(12) United States Patent
Arneault

(10) Patent No.: US 12,130,801 B2
(45) Date of Patent: Oct. 29, 2024

(54) MACHINE LEARNING MODELS FOR DISCERNING RELATIONSHIPS BETWEEN DATA STORED IN A RECORDS SYSTEM

(71) Applicant: FuelTrust, Inc., Dickinson, TX (US)

(72) Inventor: Jonathan Arneault, Gulf Breeze, FL (US)

(73) Assignee: FuelTrust, Inc., Dickinson, TX (US)

( * ) Notice: Subject to any disclaimer, the term of this patent is extended or adjusted under 35 U.S.C. 154(b) by 0 days.

(21) Appl. No.: 18/142,194

(22) Filed: May 2, 2023

(65) Prior Publication Data

US 2023/0350874 A1    Nov. 2, 2023

Related U.S. Application Data

(60) Provisional application No. 63/363,995, filed on May 2, 2022.

(51) Int. Cl.
*G06F 16/23* (2019.01)
*G06F 16/2455* (2019.01)
*G06N 7/01* (2023.01)

(52) U.S. Cl.
CPC ...... *G06F 16/2365* (2019.01); *G06F 16/2455* (2019.01); *G06N 7/01* (2023.01)

(58) Field of Classification Search
CPC .................................................. G06F 16/245
See application file for complete search history.

(56) References Cited

U.S. PATENT DOCUMENTS

2020/0118137 A1* 4/2020 Sood ...................... G06Q 10/00

OTHER PUBLICATIONS

Jun. 22, 2023, International Search Report of PCT/US23/20682.

* cited by examiner

*Primary Examiner* — Baoquoc N To
(74) *Attorney, Agent, or Firm* — Banner & Witcoff, Ltd.

(57) ABSTRACT

The present disclosure describes identifying and creating information associated with one or more items represented in a record system, such as a distributed ledger or blockchain. According to certain aspects of the disclosure, a response is received for a first record. An iterative process is performed to locate the first record in the record system. Upon determining that the first record cannot be found or that the first record is incomplete, one or more machine learning algorithms may analyze related records. Based on the analysis of the related records, the one or more machine learning algorithms may generate the first record. Alternatively, the one or more machine learning algorithms may generate the missing information. The first record may then be added to the record system and associated with the related records.

21 Claims, 12 Drawing Sheets

MACHINE LEARNING MODELS FOR DISCERNING RELATIONSHIPS BETWEEN DATA STORED IN A RECORDS SYSTEM

REFERENCE TO RELATED APPLICATIONS

This application claims the benefit of priority to U.S. Provisional Application No. 63/363,995, filed on May 2, 2022, the entirety of which is hereby incorporated by reference in its entirety.

FIELD OF THE INVENTION

Aspects of the disclosure generally relate to machine learning models and more specifically to machine learning models analyzing information to recognize and fill gaps in information contained in a record system.

BACKGROUND OF THE INVENTION

Record systems, such as supply chain management systems, blockchain ledgers, and others, typically rely upon the consensus of data producers to record, track, trace, enhance, and/or cleanse data stored within the record systems. However, leaving data producers to record, track, trace, enhance, and/or cleanse data is prone to errors. For example, records may never be created or misinformation could be recorded. When records are missing, never recorded, contain incorrect or missing data, and/or do not provide a useful declaration of the history of preceding and/or subsequent (e.g., corollary) records, the record systems lack the ability to provide participants (e.g., record writers, readers, analyzers, anti-fraud mechanisms, regulatory controllers, obligation validators, etc.) with sufficient means to have truthful and accurate insight into the lifecycle of the individual item(s) represented by the record system, including, for example, the custodians of the individual item(s) throughout the individual item's lifecycle.

Privacy and data propriety further exacerbate the challenges of tracking individual item(s) throughout their lifecycle. Legal, financial, commercial, and/or competitive risk may be created by a custodian (e.g., a raw goods producer, a component manufacturer, an assembler, a disposal service provider, a maintenance provider, etc.) that writes record information and/or updates records in a fully transparent and accessible manner.

For example, each custodian may have a unique and/or different format for recording information about the individual items. Further, custodians may not have privacy (access) to certain information associated with the individual item(s). That is, information associated with the individual item(s) may not be included in preceding records. Additionally or alternatively, the information associated with the individual item(s) may simply be incorrect. Accordingly, a custodian may not be able to create an accurate record when writing a record to the record system, thereby creating legal, financial, commercial, and/or competitive risk.

Existing data analysis technologies, such as EDI/EDI-FACT Supply Chain Networks, blockchain ledgers, hyper-ledgers, multi-enterprise public database systems, etc., inhibit multiparticipant or multi-custodial visibility via access controls, data encryption security controls, off-ledger data storage, etc., further exacerbating the challenges of tracking individual item(s) throughout their lifecycle. This limits existing data analysis technologies' ability to access a large amount of information stored by the record system. Accordingly, a significant amount of the information stored in the record system is inaccessible, unavailable, incorrect, and/or missing entirely. These gaps in the record systems create data voids that impede decision making, reliable reporting, regulatory compliance, and/or responsiveness. Thus, there is a need to address the shortcomings of existing data analysis technologies to ensure that data stored in records systems is accurate and complete.

BRIEF SUMMARY OF THE INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, methods, and computer-readable media are also within the scope of the disclosure.

The present disclosure describes methods, devices, systems, and computer readable media comprising instructions that configure a computing device to perform steps for analyzing records stored in record systems to identify missing and/or incorrect information associated with the records stored therein. The missing and/or incorrect information may include, for example, prior custodians of an item identified in a record, changes in properties of the item identified in the record, missing or misinformation associated with the item identified by the record, potential inaccuracies of the item, properties of the item, acceptance of the item by a prior custodian, rejection of the item by a prior custodian, and/or preceding, ancillary, or subsequent (e.g., corollary) records related to an individual record.

To address the missing and/or incorrect information, the present disclosure also describes techniques for creating records, or editing existing records, to address the missing and/or incorrect information associated with the records. In particular, the techniques described herein may create information and/or indexes of information regarding records. This may include identifying relationships between records, including, for example, process flow, parent-child relationships, supplemental records, and the like. Additionally, the techniques described herein may create information which may be used to identify, reconstruct, correct, validate, and/or supplement records. The records created using the techniques described herein may allow for records to be created with a degree of probable certainty. Moreover, the records created using the techniques described herein, and their relationships to other records, may be published for review and/or approval by others. Once consensus is realized, the created records may be added to the records system.

According to some aspects of the disclosure, a computer-implemented method may receive a request for information associated with a first record. Based on a determination that the first record has not been found or is incomplete, the computer-implemented method may invoke an iterative discoverative process to identify missing information. Based on results obtained by querying a discoverative ledger, the computer-implemented method may analyze one or more records to identify a subset of records that may be associated with the first record and determine, based on the analysis, that the first record is associated with an interrupted chain of records. The analysis may include at least one of a Monte Carlo analysis, a Reverse Monte Carlo Analysis, a Bayesian frequency analysis, a Bayesian Epistemological analysis, or a derivative of such analysis. Based on a determination that the first record is associated with an interrupted chain of records, the computer-implemented method may create one or more temporary records to replace missing information in the chain of records associated with the first record, for example, using a machine learning model. The one or more temporary records may be created based on information contained in the subset of records that may be associated with the first record. The computer-implemented method may then send a first temporary record, of the one or more temporary records, to a user device. Sending the first temporary record may comprise sending the first temporary record to at least one of a record inquirer or a record owner. The computer-implemented method may receive an indication that the first temporary record is approved. The computer-implemented method may then store the first temporary record to complete the interrupted chain of records. Storing the first temporary record to complete the interrupted chain of records may include storing the first temporary record in a discoverative ledger. The computer-implemented method may also send the first temporary record, for example, in response to the request for information associated with the first record.

In some examples, analyzing the one or more records to identify the subset of records that may be associated with the first record may include identifying a first subset of records that may be associated with the first record, wherein the first subset comprises a first probability that the first subset of records is associated with the first record, identifying a second subset of records that may be associated with the first record, wherein the second subset comprises a second probability that the second subset of records is associated with the first record, and selecting, based on the first probability being higher than the second probability, the first subset of records, wherein the one or more temporary records are generated based on data contained in the first subset of records.

According to another aspect of the disclosure, a computing system may comprise one or more processors and memory storing instructions that, when executed by the one or more processors causes the computing system to: receive a request for information associated with a first record; based on a determination that the first record has not been found or is incomplete, invoke an iterative discoverative process to identify missing information; analyze, based on results obtained by querying a discoverative ledger, one or more records to identify a subset of records that may be associated with the first record; determine, based on analysis of the one or more records, that the first record is associated with an interrupted chain of records; based on a determination that the first record is associated with an interrupted chain of records, create, using a machine learning model, one or more temporary records to replace missing information in the chain of records associated with the first record; send, to a user device, a first temporary record of the one or more temporary records; receive, from the user device, an indication that the first temporary record is approved; and store the first temporary record to complete the interrupted chain of records.

According to a further aspect of the disclosure, a non-transitory computer-readable medium is disclosed that comprises instructions that, when executed, configure a computing system to: receive a request for information associated with a first record; based on a determination that the first record has not been found or is incomplete, invoke an iterative discoverative process to identify missing information; analyze, based on results obtained by querying a discoverative ledger, one or more records to identify a subset of records that may be associated with the first record; determine, based on analysis of the one or more records, that the first record is associated with an interrupted chain of records; based on a determination that the first record is associated with an interrupted chain of records, create, using a machine learning model, one or more temporary records to replace missing information in the chain of records associated with the first record; send, to a user device, a first temporary record of the one or more temporary records; receive, from the user device, an indication that the first temporary record is approved; and store the first temporary record to complete the interrupted chain of records.

The techniques described herein overcome the shortcomings of existing data analysis technologies by analyzing existing records to correct and/or add records to ensure that the data stored in a record system is accurate and complete. The features, along with many others, and benefits are discussed in greater detail below.

BRIEF DESCRIPTION OF THE DRAWINGS

The present disclosure is described by way of example and not limited in the accompanying figures in which.

DETAILED DESCRIPTION

In the following description of the various example embodiments, reference is made to the accompanying drawings, which form a part hereof, and in which is shown by way of illustration various example embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Figure 1A:
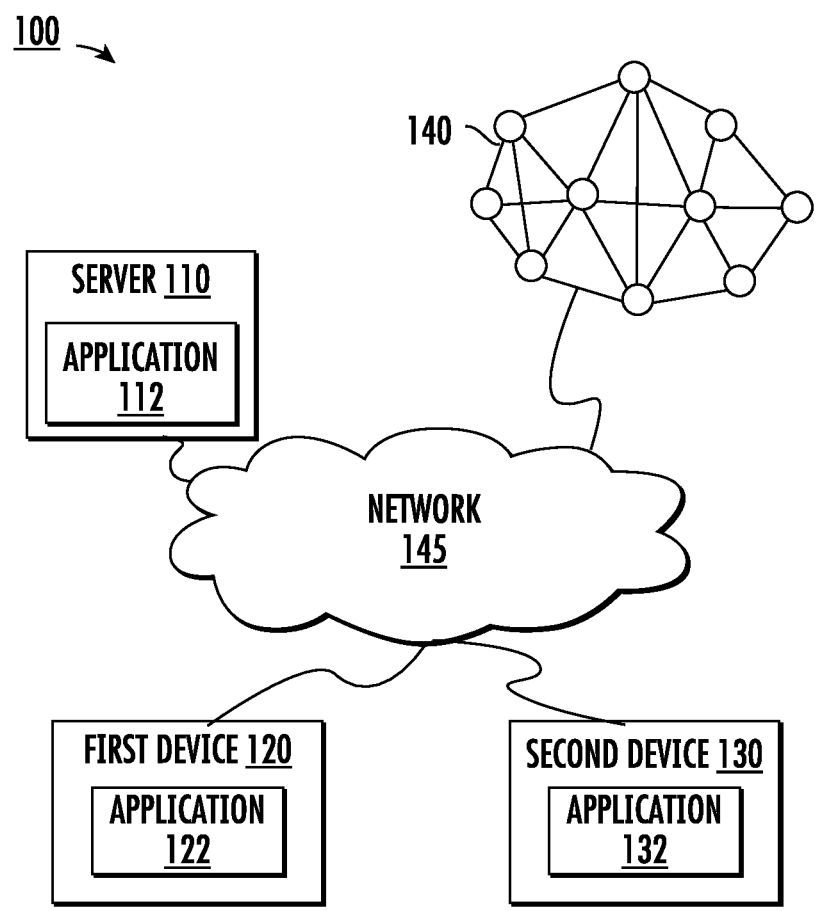
FIGS. 1A-1B show an example of a system for writing and updating data and/or information to a ledger in accordance with one or more aspects of the disclosure.

FIG. 1A shows an example of a system 100 comprising a first server 110, a first entity 120, a second entity 130, and a record system 140 interconnected via a network 145.

Server 110 may be any server capable of executing application 112. In this regard, server 110 may be a stand-alone server, a corporate server, or a server located in a server farm or cloud-computer environment. According to some examples, server 110 may be a virtual server hosted on hardware capable of supporting a plurality of virtual servers. As noted above, server 110 may execute application 112.

Application 112 may be server-based software configured to analyze one or more records stored in a records system (e.g., records system 140) and identify missing records, inaccurate records, and/or relationships between records. Additionally or alternatively, application 112 may authenticate relationship across an item's lifecycle, digitally verify data from shared sources, validate compliance, and/or identify potential fraud. The application 112 may receive a record to be written to a records system, such as the records system 140, from a computing device. The record may comprise a unique code and a transaction identifier. The transaction identifier may indicate a transaction associated with the record. The record may also comprise one or more identifiers associated with one or more second users who are authorized to approve the record. The identifiers may comprise a phone number (e.g., cell phone number), email address, a username, etc. Additionally or alternatively, the record may comprise a different unique code for each of a plurality of approving devices (e.g., devices associated with users authorized to review the record). Upon receiving the record, the application 112 may notify the one or more second users that the one or more second users have a record for their review. The notification may be sent via an electronic communication, such as digital message, API call, file input, asynchronous data communication, synchronous communication, email communication, push notification, etc. The notification may comprise the unique code and the transaction identifier. The application 112 may receive one or more verifications of the unique code and the transaction identifier from the one or more second users. If a consensus of the one or more second users verify the transaction, the application 112 may write (e.g., commit) the record to the records system (e.g., records system 140). The application 112 may sign the record prior to writing the record to the ledger. In this regard, the application 112 may act as a proxy node to create a local permission system within a global permission system of the records system. Additionally or alternatively, the application 112 may execute a private ledger that allows the record to be validated by the one or more second users. After the record is validated, the application 112 may write (e.g., commit) the record to a public ledger, such as records system 140. In some examples, the private ledger and public ledger may form a hybrid ledger accessible by third parties.

Additionally or alternatively, the application 112 may comprise logic that reads and/or writes to the records system 140. The logic may comprise a chemical analysis component that analyzes the chemical composition of an item (e.g., resource, commodity, etc.), for example, using the process described in U.S. application Ser. No. 17/722,906, filed on Apr. 18, 2022 entitled "Machine-Learning-Based Chemical Analysis," the entirety of which is herein incorporated by reference in its entirety. The logic may consider a variety of factors to determine whether the chemical composition of the item has changed, including, for example, time, temperature, changes in temperature, sedimentation, humidity, light exposure, oxidation, etc. If the chemical composition of the resource has changed, the application 112 may create a new record for the item that indicates the change to the item. The chemical composition logic may run periodically (e.g., hourly, daily, weekly, monthly, etc.). Additionally or alternatively, the chemical composition logic may generate an alert, for example, if the change in the chemical composition of the item presents a danger (e.g., health risk, fire risk, etc.). In some examples, the application 112 may invoke one or more smart contracts on a ledger, such as records system 140. The one or more smart contracts may record a new record on the ledger or change an existing record on the ledger.

The application 112 may also comprise artificial intelligence. The artificial intelligence may comprise one or more machine learning models. The one or more machine learning models may comprise a neural network, such as a convolutional neural network (CNN), a recurrent neural network, a recursive neural network, a long short-term memory (LSTM), a gated recurrent unit (GRU), an unsupervised pre-trained network, a space invariant artificial neural network, a generative adversarial network (GAN), or a consistent adversarial network (CAN), such as a cyclic generative adversarial network (C-GAN), a deep convolutional GAN (DC-GAN), GAN interpolation (GAN-INT), GAN-CLS, a cyclic-CAN (e.g., C-CAN), or any equivalent thereof. Additionally or alternatively, the machine learning model may comprise one or more decisions trees.

The artificial intelligence may be trained to review and/or analyze (e.g., extract) the records stored in the ledger to identify the parties and/or processes, identify relationships between various resources and/or data stored in the ledger, authenticate relationships across a resource's lifecycle, digitally verify data from shared sources, validate compliance with laws and regulations, and/or identify potential fraud. The one or more machine learning models may be trained using supervised learning, unsupervised learning, back propagation, transfer learning, stochastic gradient descent, learning rate decay, dropout, max pooling, batch normalization, long short-term memory, skip-gram, or any equivalent deep learning technique. Once the one or more machine learning models are trained, the one or more machine learning models may be exported and/or deployed in application 112. The application 112 may then analyze and/or review the records in the ledger (such as a blockchain) to reduce the risk associated with one or more resources.

First device 120 may be a mobile device, such as a cellular phone, a mobile phone, a smart phone, a tablet, a laptop, or an equivalent thereof. Additionally or alternatively, first device 120 may comprise a desktop computer or, alternatively, a virtual computer. First device 120 may provide a first user with access to various applications and/or services. For example, first device 120 may provide the first user with access to the Internet. Additionally, first device 120 may provide the first user with one or more applications ("apps") located thereon. The one or more applications may provide the first user with a plurality of tools and access to a variety of services. In some examples, the one or more applications may include an application 122. Application 122 may be a client-based application corresponding to the application 112. In this example, the application 122 may create a record to write to the records system. Additionally, the application 122 may add metadata to the record. The metadata may comprise a unique code, a transaction identifier, and/or the one or more second users designated to approve the record. In some examples, the application 122 may obfuscate and/or encrypt the metadata. The application 122 may send the record to the server 110, which may send the record to the one or more second users identified in the metadata so that the one or more second users can verify (or deny) the record. Additionally or alternatively, the application 122 may receive an indication of one or more records that require review. In this regard, the first device 120 and/or the application 122 may receive a unique code and a transaction identifier of a record that requires review. The application 122 may retrieve the record, for example, using the transaction identifier. The record may be retrieved from the server 110, the application 112, a private ledger (e.g., database) (not shown), the record system 140, or any combination thereof. Upon receiving the record, the first device 120 (e.g., application 122 executing on first device 120) may compare the unique code with a unique code stored with the record. If the codes match, the application 122 may provide a notification to the server 110 (e.g., the application 112 executing on the server 110) that the record is verified. Similarly, if the codes do not match, the application 122 may provide a notification to the server 110 (e.g., the application 112 executing on the server 110) that the record is not verified. As noted above, the application 112 may track verifications and, if a consensus (e.g., a predetermined number of approving devices) is reached, write the record to the records system 140. Additionally or alternatively, the application 122 may invoke one or more smart contracts to record a new record in record system 140 or change an existing record in record system 140.

The second device 130 may be any of the devices discussed above with respect to the first device 120. Similarly, the second device 130 may execute application 132, which may provide similar functionality to the functionality described above with respect to the application 122.

The record system 140 may be any suitable storage and/or file system. For example, the record system 140 may comprise a data store, a data warehouse, a data lake, a supply chain network, a public blockchain, a private blockchain, a hybrid blockchain, a distributed database, an immutable database, a multi-enterprise public database, a distributed ledger, a hyper-ledger, etc. The record system 140 may store the records associated with the one or more items. Additionally or alternatively, the record system 140 may store the one or more smart contracts referred to herein. The record system 140 may be a declarable blockchain. Additionally or alternatively, the record system 140 may be a discoverable blockchain, wherein interrelationships between blocks of data stored in the record system 140 may be identified, for example, using recursive analysis of the blocks stored in the record system 140. As described in greater detail below, this may allow computing devices to perform a forensic analysis of the data contained in the blocks. The forensic analysis may help to identify the source of an item and/or how the item has changed or been modified over the course of the item's lifecycle.

Network 145 may include any type of network. In this regard, the network 145 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 1B:
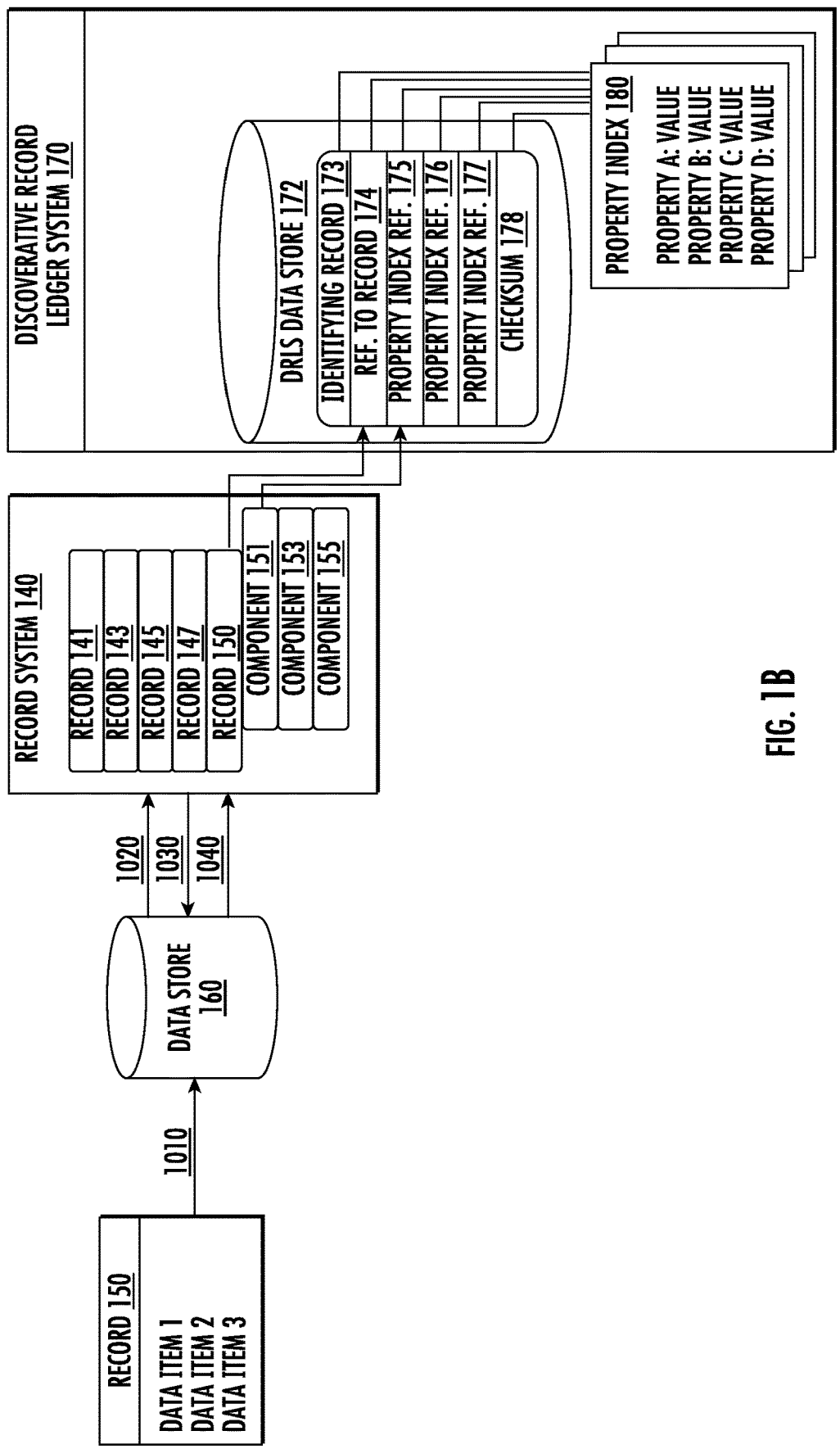

FIG. 1B shows an example of storing a record in a record system in accordance with one or more aspects of the disclosure. Some or all of the steps shown in FIG. 1B may be performed using one or more computing devices as described herein, including, for example, the server 110, the first device 120, the second device 130, the record system 140, the computing device 200, or any combination thereof.

As shown in FIG. 1B, a record system, such as record system 140, may receive a record (e.g., record 150). The record may be new information or may comprise an update, such as an update to the properties of the item associated with record 150. In step 1010, the record 150 may be stored (recorded) in data store 160. The data store 160 may be any suitable memory storage device, including, for example, computer memory or a storage system (e.g., a computer disk storage device). The data store may be a temporary data storage until the record 150 may be processed (acted upon), for example, by the record system 140. In step 1020, the data store 160 may notify the record system 140 of the new information (e.g., record 150). Additionally or alternatively, the record system 140 may identify (e.g., look-up) any new records and/or information periodically, for example, in step 1030.

After being notified of new records and/or information, the record system 140 (e.g., a blockchain ledger, supply chain network, etc.) may retrieve the record 150 in step 1040. Additionally, the record system 140 may analyze the record 150 and its component properties 151, 153, 155. The analysis may comprise invocation of blockchain smart contracts and/or supply chain network message validation and routing. While the record system 140 is analyzing the record 150, a Discoverative Record Ledger System (DRLS) 170 may create one or more proprietary records (e.g., 173, 174, 175, 176, 177, 178) related to the item record 150. The one or more proprietary records may be stored in a datastore 172. The datastore 172 may be the same as datastore 160 or unique to the DRLS 170. Additionally or alternatively, datastore 172 may be some other temporary data storage. The one or more proprietary records may include identifying component information within the record, including, for example, unique information regarding the related item(s), such as record identifier 174, unique information to the item record, common information contained in the record (175, 176, 177), record sourcing information (e.g., the authoring system or individual, network routing information, processing instructions within the record, etc), and/or checksum information 178.

The DRLS 170 may generate and apply a unique identifier to each of the proprietary records generated. The record (e.g., 150) may be written to the DRLS 170, for example, in data store 172. The record (e.g., 150) may be written to the DRLS 170, but not committed to the DRLS 170. Any information written to DRLS 170 may include any applicable encryption, access control information or control rules, data encapsulation, business instructions, etc.

In some instances, DRLS 170 may determine that two or more records may be related to one another. When DRLS 170 determines that two or more records are related, DRLS 170 may index the DRLS, for example, in property index 180. The information contained in the property index 180 may identify which item records are related and apply access control safeguards and/or encryption techniques methodology chosen by the implementor to the records and their related records. The record system (e.g., record system 140, DRLS 170, both) may be a participant such that the record system has access to read the property index 180 and the records contained therein.

After successfully analyzing the records and identifying any relationships, the DRLS 170 may commit the record (e.g., record 150), related record(s), and/or index information in a single multi-write process. The multi-write process may comprise a verification step and/or a commit step.

Figure 2:
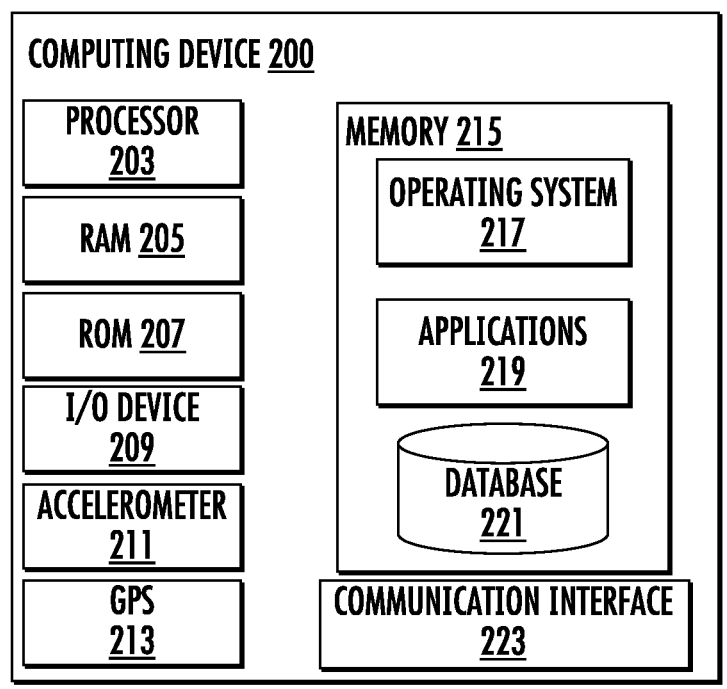
FIG. 2 shows an example of a computing device in accordance with one or more aspects of the disclosure.

Any of the devices and systems described herein may be implemented, in whole or in part, using one or more computing devices described with respect to FIG. 2. Turning now to FIG. 2, a computing device 200 that may be used with one or more of the computational systems is described. The computing device 200 may comprise a processor 203 for controlling overall operation of the computing device 200 and its associated components, including RAM 205, ROM 207, input/output device 209, accelerometer 211, global-position system antenna 213, memory 215, and/or communication interface 223. A bus 202 may interconnect processor(s) 203, RAM 205, ROM 207, memory 215, I/O device 209, accelerometer 211, global-position system receiver/antenna 213, memory 215, and/or communication interface 223. Computing device 200 may represent, be incorporated in, and/or comprise various devices such as a desktop computer, a computer server, a gateway, a mobile device, such as a laptop computer, a tablet computer, a smart phone, any other types of mobile computing devices, and the like, and/or any other type of data processing device.

Input/output (I/O) device 209 may comprise a microphone, keypad, touch screen, and/or stylus through which a user of the computing device 200 may provide input, and may also comprise one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may comprise volatile and nonvolatile, removable and non-removable media implemented in any method or technology for storage of information such as computer-readable instructions, data structures, program modules, or other data. Memory 215 may comprise one or more physical persistent memory devices and/or one or more non-persistent memory devices. Memory 215 may comprise random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user.

Communication interface 223 may comprise one or more transceivers, digital signal processors, and/or additional circuitry and software, protocol stack, and/or network stack for communicating via any network, wired or wireless, using any protocol as described herein.

Processor 203 may comprise a single central processing unit (CPU), which may be a single-core or multi-core processor, or may comprise multiple CPUs. Processor(s) 203 and associated components may allow the computing device 200 to execute a series of computer-readable instructions (e.g., instructions stored in RAM 205, ROM 207, memory 215, and/or other memory of computing device 215, and/or in other memory) to perform some or all of the processes described herein. Although not shown in FIG. 2, various elements within memory 215 or other components in computing device 200, may comprise one or more caches, for example, CPU caches used by the processor 203, page caches used by the operating system 217, disk caches of a hard drive, and/or database caches used to cache content from database 221. A CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For example, in a multi-tiered application, a database cache on an application server may reduce data retrieval and data manipulation time by not needing to communicate over a network with a back-end database server. These types of caches and others may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the disclosure.

Figure 3A:
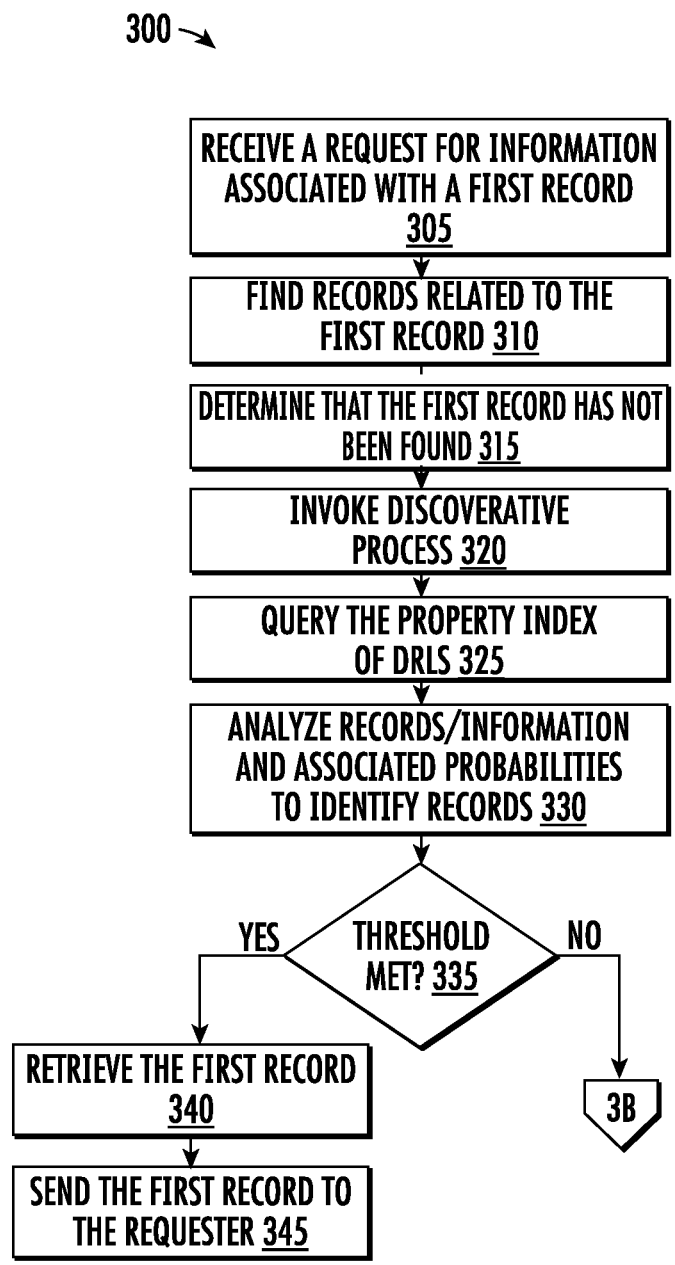
FIGS. 3A-3C shows a process for identifying and/or creating one or more missing records in a record system in accordance with one or more aspects of the disclosure.
Figure 3B:
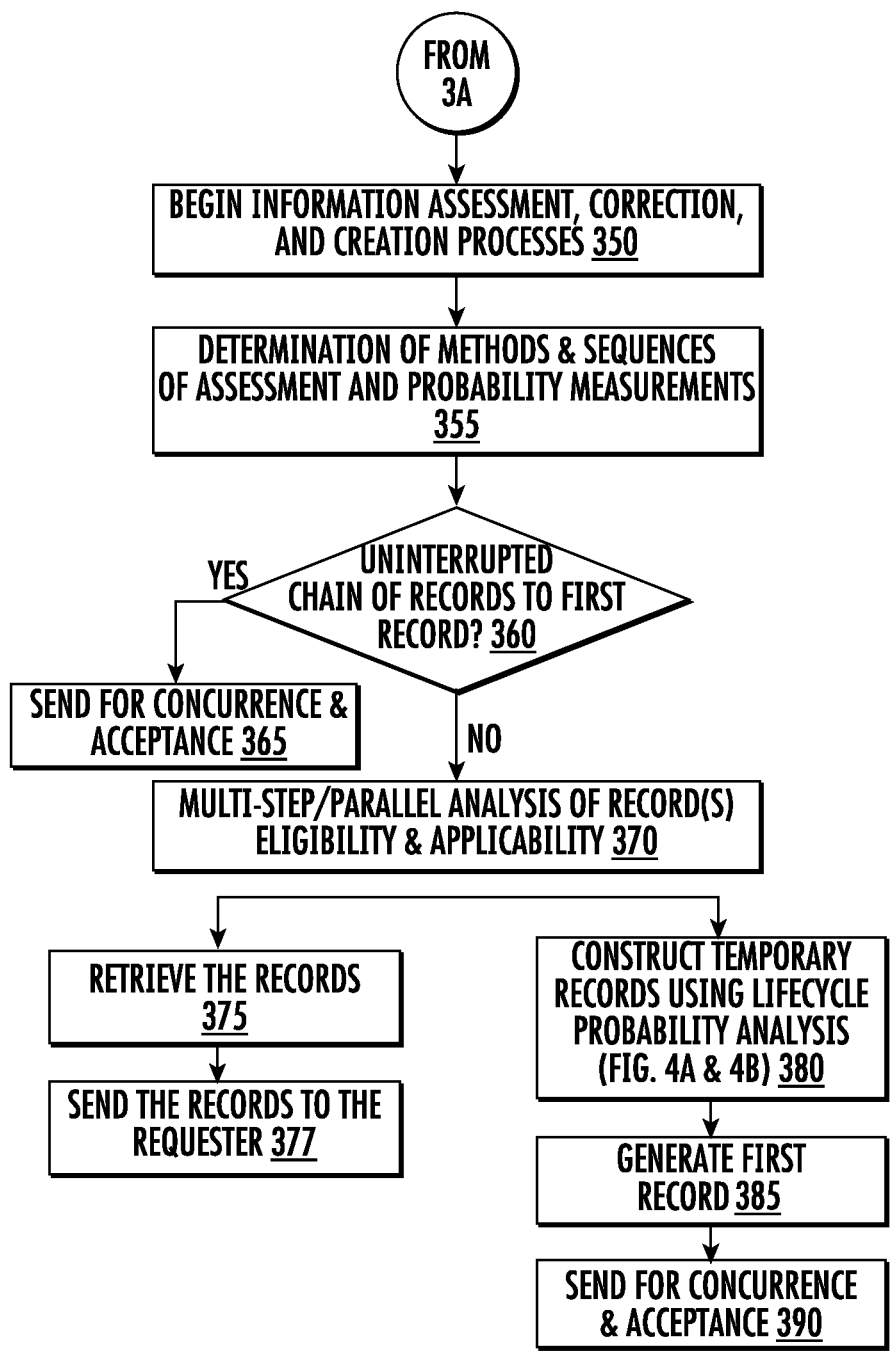
Figure 3C:
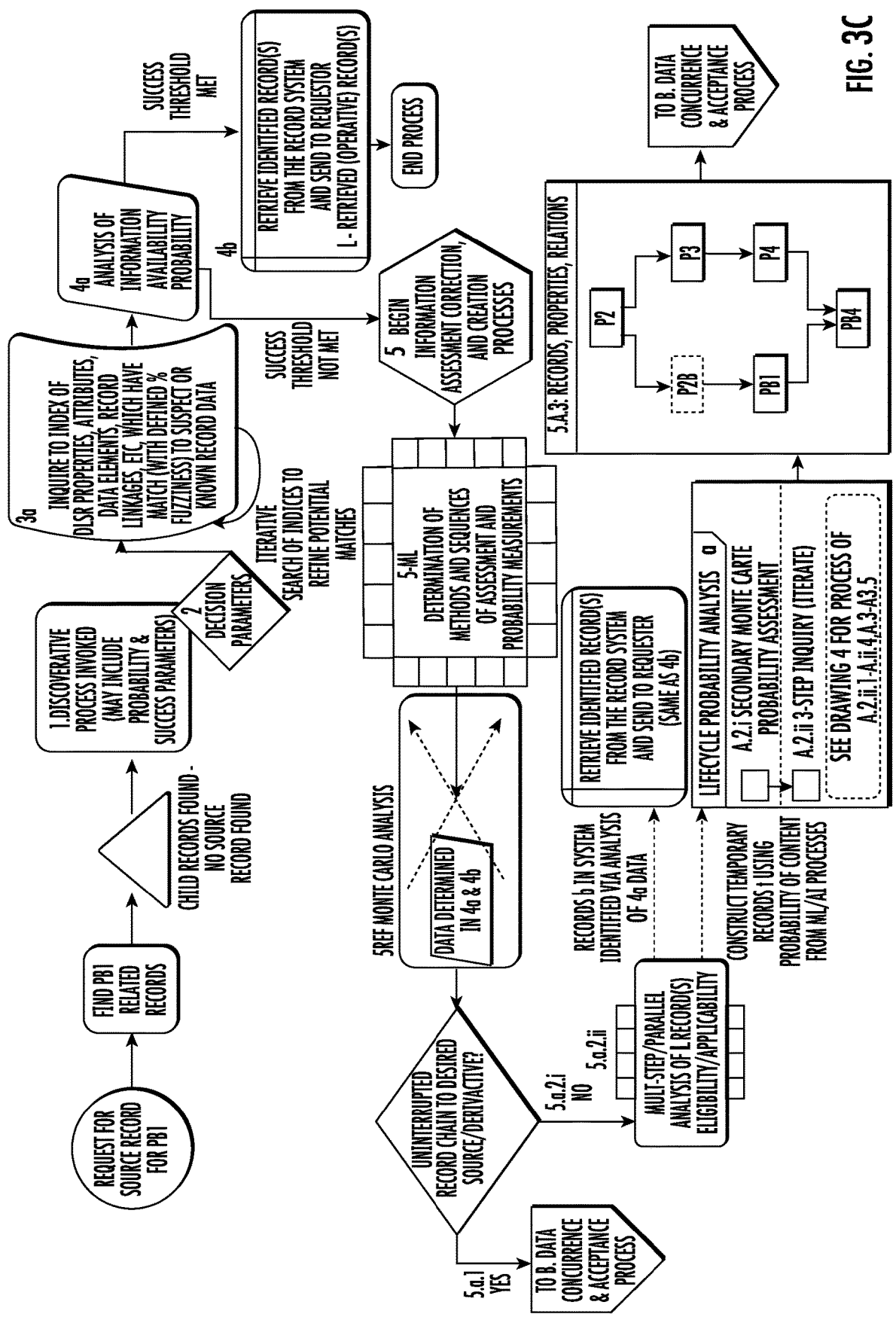

Due to failure to report information or reporting the wrong (e.g., incomplete) information, retaining the privacy of information in supply chain or lifecycle reporting creates significant technical and process hurdles for the record system. This may lead to issues related to regulatory compliance, contract compliance, risk avoidance, commercial optimization, financial optimization, and a variety of other issues. This issues primarily stem from requests for information that is not recorded in the supply chain or item lifecycle. For example, the supply chain or lifecycle management system may receive requests, from a custodian or constituent, for records or information related to an item. However, the supply chain or lifecycle management system may lack the requested information, either by design of the prior constituents or due to lack of availability of information. Historically, the missing records and/or information would be addressed via a direct inquiry to the last known accessible data producer or custodian. The present disclosure overcomes the shortcomings of historical approaches through a multi-modality approach. FIGS. 3A-3C shows an example of the multi-modality process 300 in accordance with one or more aspects of the disclosure. Some or all of the steps shown in FIGS. 3A-3C may be performed using one or more computing devices as described herein, including, for example, the server 110, the first device 120, the second device 130, the record system 140, the DRLS 170, the computing device 200, or any combination thereof.

Through a multi-modality process 300 shown in FIGS. 3A-3C, the DRLS 170 may be able to provide missing information and/or correct information, while retaining the privity of information owned by other custodians and/or constituents. Additionally or alternatively, the DRLS 170 may provide a claim about information in records without reporting such information itself. The DRLS 170 may apply investigative and/or validating mechanisms at each step. The techniques described below may be applied using the DRLS 170 or any other discoverative ledger record system, including external discoverative ledger record systems which may receive records and/or information from third parties.

In step 305, a computing device (e.g., record system 140) may receive a request for information associated with a first record. The request for information associated with the first record may be a request for a source record. Additionally or alternatively, the request may be for the first record itself. The computing device may determine that the information associated with the first record (or the first record) is not maintained in a data store. In step 310, the computing device may find records related to the first record; however, the computing device may determine that no source record has been found, in step 315. Additionally, or alternatively, the computing device may determine that a record is incomplete.

Figure 5:
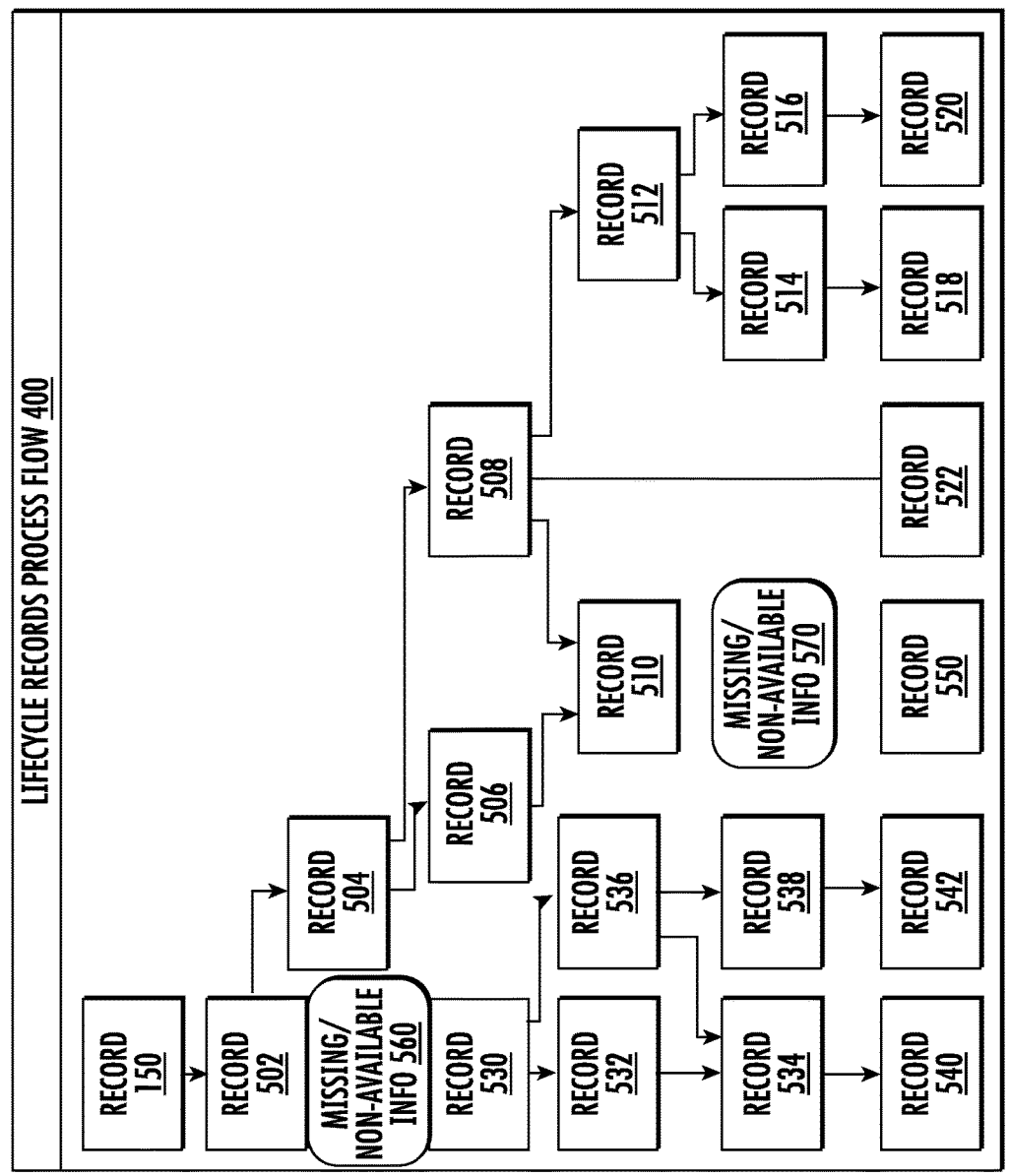
FIG. 5 shows an example of a distributed record ledger system in accordance with one or more aspects of the disclosure.
Figure 5:
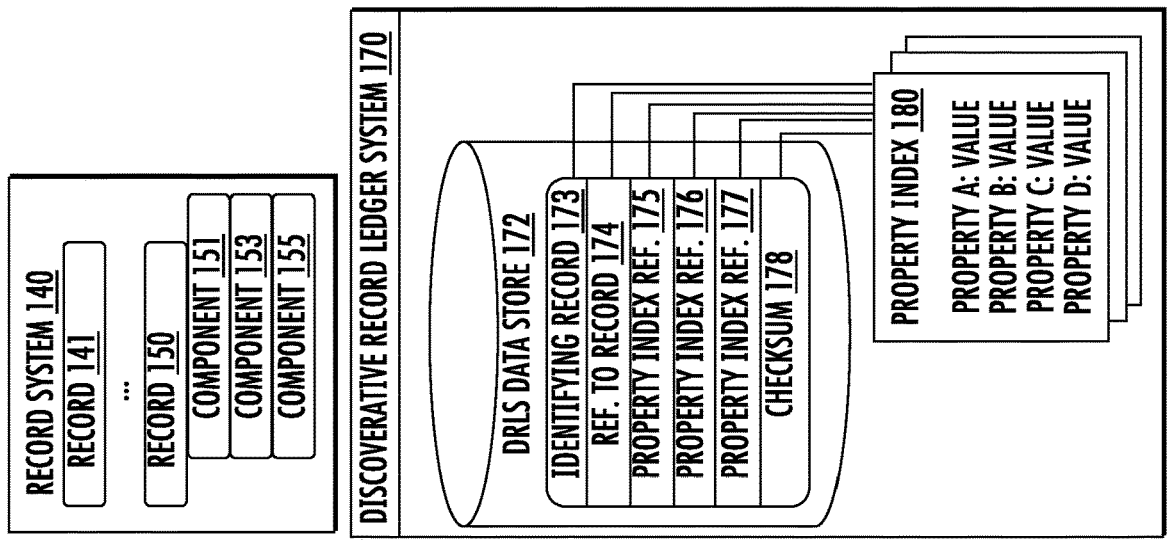

In response to determining that no source record has been found, the computing device may invoke a discoverative process in step 320 (FIG. 3C, reference character 1). The discoverative process may be a program, routine, smart contract, etc. The discoverative process may be used to identify missing information, such as first missing information 560 and second missing information 570 shown in FIG. 5. Alternatively, the missing information requested may correspond to an origin source, such as origin records 502 or 510 in FIG. 5 or item properties, such as properties 151, 153, 155 shown in FIG. 1B. The item properties may include one or more of parametric properties, custodial transaction information, information to validate contract compliance, regulatory approval of source components, validation of non-use of sanctioned parties, etc. The discoverative process may be invoked either programmatically or via user interaction. Additionally, the invocation of the discoverative process may comprise decision parameters (FIG. 3C, reference character 2) that define the measurement of success probability thresholds for the investigative process. Further, the information to be inquired may be identified to the discoverative process via a pre-defined method, such an application programmable interface (API), a stored procedure, a messaging interface, and/or other suitable computer invocation technique. Invocation of the discoverative process may include directive information as to which investigatory or discoverative mechanisms or components to invoke or prioritize, in addition to the identification of the information to be inquired of.

In step 325 (FIG. 3C, reference character 3a), the computing device may query a DRLS, such as DRLS 170. The computing device may identify what information is accessible within the ledger within the lifecycle record set applicable to the item record being inquired of. While an index may not contain the requested information, a statement of the information's existence (or non-existence) informs the inquiry such that one or more machine learning models, or a combination of user/system directions and machine learning model, can invoke and optimize investigative steps to discover and/or generate the information. The computing device may inquire to an index (e.g., property index 180) of DRLS to determine which records (with a defined fuzziness percentage) match the requested record. Additionally or alternatively, the inquiry may identify suspected or known record data that matches the request. In this regard, the computing device may employ an iterative approach of indices to identify and/or refine potential matches to the request for the first record. Each matching record may comprise one or more lifecycle record identifiers that match the request.

In step 330, the computing device may analyze records and/or information, and their associated probabilities, to identify one or more records that may be related to the inquiry. The computing device (e.g., the discoverative record ledger system) may invoke an initial analysis of information and availability probability. The analysis performed by the computing device may comprise success threshold characteristics, which may be defined by a user, a smart contract, a stored procedure, an external system, another source, or any combination thereof. The success threshold characters may be passed to the computing device as part of the custodian or constituent request received in step 305.

In step 335, the computing device may determine if the index satisfies a threshold. That is, the computing device may determine whether the index contains sufficient information to meet the threshold. When the threshold is satisfied, process 400 proceeds to step 340 with the computing device retrieving the first record or information associated with the first record. That is, the computing device may process the request to the DRLS data store 172 and retrieve one or more records from the record system identified via the inquiry performed during the initial investigatory step (e.g., FIG. 3A, step 325; FIG. 3C, reference character 3a). In step 345, the first record (e.g., one or more records) may be sent to the requester.

However, when access to the requested information is unavailable, for example, due to privacy controls, missing information, record properties which fail data validation controls, etc., process 300 may proceed to step 350 (FIG. 3C, reference character 5) where the computing device begins information assessment, correction, and/or creation processes. That is, to further the discoverative and/or investigative process, the computing device may utilize a plurality of techniques to respond to the request. For example, the computing device may utilize one or more machine learning models or artificial intelligence techniques to determine the probabilities of possible information which would enhance, "fill in," correct, or otherwise inform the request when such information in the ledger is missing, inaccurate, or determined to be unreliable, for example, based on computer instructions, business rules, the instructions of the inquiry, or the analysis processes described herein.

In step 355, the computing device may determine methods and sequences of assessment and measure probabilities (FIG. 3C, reference character 5-ML). The computing device may use one or more machine learning model techniques, described above. Moreover, the order, type, and/or the number of iterations applied by the one or more machine learning models may be determined (defined) by the computing device (e.g., record system 140, DRLS 170, or any combination thereof), directions (electronic or programmatic) provided by the requester, or by an external system (e.g., an artificial intelligence-based system). In step 360, the computing device may determine if the records identified in step 330 (FIG. 3C, reference characters 3a, 4a) provide an uninterrupted lifecycle chain of records to the requested record. That is, the computing device may analyze (review) the blockchain as the item passed from custodian to custodian to arrive at the operative record. The computing device may render the determination by invoking a Monte Carlo analysis. The Monte Carlo analysis may use randomness to determine (identify) one or more records that may be the requested record or related to the requested record.

If the lifecycle chain of records is determined to be uninterrupted in step 360, then the computing device sends the one or more records for concurrence and acceptance in step 365. The concurrence and acceptance is described in greater detail below with respect to FIGS. 6A and 6B. For the purposes of this disclosure, "uninterrupted" shall mean that every record identified in the lifecycle has a record preceding it that is identifiable as the prior custodial interaction for the record at each step until reaching the "source material." Source material, as used herein, may refer to the origin record (i.e., the first recorded record associated with an item) or a predetermined number of records defined, for example, in the request for the information.

However, if the lifecycle chain of records is determined to be interrupted, then the computing device invokes a multi-step-modality process to determine which records in the system should be considered records in the lifecycle in step 370 (FIG. 3, reference character 5a.2.i). For the purposes of this disclosure, an "interrupted" lifecycle chain of records is when a quantity (number) of the operative records do not meet a threshold of probability, validation of a "source material" record, or cannot satisfy the predetermined number of records defined in the request for the information. To determine whether the lifecycle chain of records is uninterrupted, the computing device may begin with the earliest identified lifecycle record. The computing device may perform a record search using a Monte Carlo analysis of the index (e.g., property index 180) using the properties from the earliest identified lifecycle record as one of the variables in the analysis. For example, normal iterative Monte Carlo distribution models may be applied in order to refine or weight the outcome of the analysis. Distributions, such as Pareto, Pert, Reciprocal, Normal/Bell, Resample Uniform, Resample Pert, etc., may be also performed, for example, based on the inquiry instructions, system defined threshold or sampling requirements, or logic determined by the system's machine learning processes in order to optimize inquiries. Based on the analysis, the computing device may determine a probability distribution of potential source records in the lifecycle. This result may not provide sufficient results to identify the actual, or highly probably, origin record(s). The exception is when the results return a single record. Accordingly, additional analysis may be performed to leverage the initial data set of records created by the Monte Carlo analysis. In step 375, the computing device may determine which records in the system should be considered records in the lifecycle chain, but are not currently recorded or identified as such in the data store. Using the techniques described herein, the computing device may generate an operative array of probable record data sets. Additionally or alternatively, the computing device may derive values for each of the data sets, including their probability assessments, correlation weights/measurements, accuracy probabilities, frequency, uniqueness, dimensions, etc. The records (e.g., the operative array) may be sent to the requester in step 377. Additionally or alternatively, the computing device may determine whether there is sufficient information to create temporary records between the last known applicable record in the lifecycle and the next known probable records earlier in the lifecycle in step 380 (FIG. 3C, arrow from reference character 5.a.2.ii to Lifecycle Probability Analysis). The determination of whether there is as determined by the discoverative ledger record systems lifecycle probability analysis, which is shown in FIG. 4A.

Figure 4A:
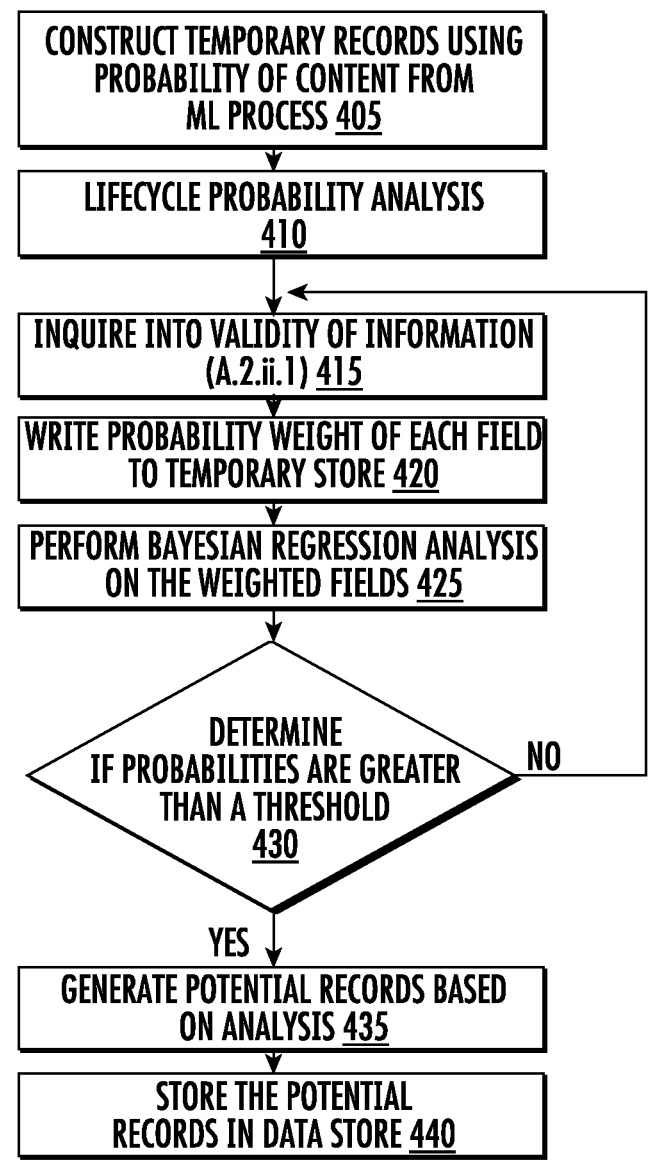
FIG. 4A-4C shows a process for adding to and/or creating missing records in accordance with one or more aspects of the disclosure.

As shown in both steps 380 and step 405 of FIG. 4A, the computing device may construct one or more temporary records using the probability of content from the machine learning processes. The computing device may generate the one or more temporary records using one or more machine learning models. The one or more temporary records may be based on the information contained in the report, the additional information contained in other records and, specifically, those records that are most likely associated with the requested record. The machine learning processes may determine a likelihood percentage for each of the one or more temporary records. That is, the one or more machine learning models may identify a probability that the requested record is associated with the discovered records.

The resulting set of probable record sets (e.g., the one or more temporary records), including refined record sets with their system derived values, may be investigated further via a three-step inquiry utilizing additional techniques determined by the one or more machine learning models based on the techniques efficacy in application to the record(s) being investigated. The three-step inquiry may be based on the following deterministic questions:

1. Could (record/result) be true?
2. Is (record/result) probably true?
3. Is (record/result) actually true (independent or uninfluenced by probability)?

Figure 4B:
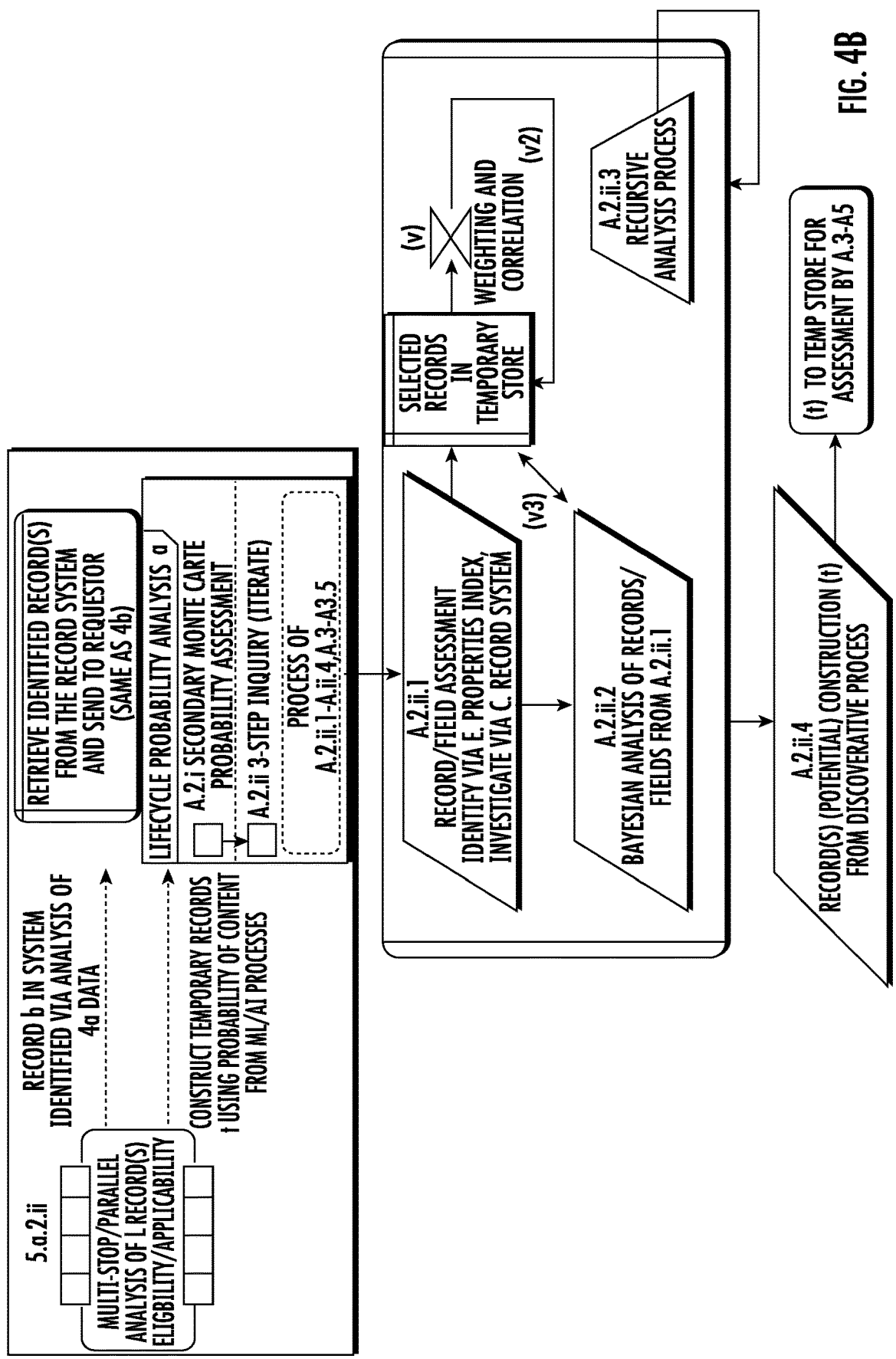

This investigative questioning may be applied by the computing device in multiple iterative cycles, which further refine the outcomes of the result set(s) until the last question is positively answered within acceptable probability assessment (e.g., acceptable range of probability). This may constitute the lifecycle probability analysis shown, for example, in FIG. 3C ("Lifecycle Probability Analysis"), FIG. 4A, step 410, and FIG. 4B ("Lifecyle Probability Analysis").

In step 415 (FIG. 4B, reference character a.2.ii.1), the computing device may inquire into the validity of the information of the operative record as assessed using a distribution analysis for each data field/property in the operative record against all probable record sets. The analysis may use an overall weighting of each field and/or property for records with similar characteristics (e.g. correlation between fields, frequency of correlation, origin of field data, etc). The computing device may assign a probability weight to the veracity of the data contained in each field. This field-by-field probability result is kept written in a temporary data store, in step 420, and may be further analyzed as discussed in greater detail below.

In step 425 (FIG. 4B, reference character a.2.ii.2), the computing device may perform a Bayesian regression analysis against the weighted fields of the datasets written to the temporary data store in step 420. That is, the computing device may inquire into the resulting output of the dataset from step 415 (FIG. 4B, reference character a.2.ii.1) and perform a regression analysis (e.g., a Bayesian regression analysis) against the weighted fields to determine, for example, the probability of accurate, or truthfulness, for the data in the field against the combined output data set in corresponding fields determined in step 370 (FIG. 3, reference character 5a.2.i). Using a Bayesian epistemological interpretation of the resulting comparative analysis, the computing device may refine the data set to a smaller set of potential matches for source records within the possible item lifecycle records.

In step 430, the computing device may determine if the probabilities are greater than a threshold. If not, the computing device returns to step 415 and performs the analysis described above. If so, the computing device proceeds to step 435. That is, the computing device may run recursively against the resulting outputs to create a set of probable lifecycle record flows (e.g., —record flow set 1: X1->X2->X3; set 2: X3->X1->X2; set 3: X2->X1->X3; etc). The computing device may determine a probability for each lifecycle record flow set. For each set, the three step inquiry noted above is made until the resulting outcome is recorded into the temporary storage array for the outputs to be acted upon in step 440. Using the techniques described above, each potential record, and each potential lifecycle record flow set, have the questions "could (record/result) be true" and "is (record/result) probably true" determined, and such outcomes are written into the system's temporary storage for further operation upon.

Returning to step 385 of FIG. 3B, the computing device may use a combination of the resultant sets of step 375 and step 435 to craft potential records. The potential records may include creating hypothetical record information that changes within those hypothetical records by means of probabilistic data enhancement and/or application. The probabilistic data enhancement and/or application may include sophisticated artificial intelligence systems or algorithmic determinism models to construct information from known sources or models. The creation of these hypothetical records (e.g., lifecycle record sets) in place of determined or inferred missing records are then applied in further recursive analysis (e.g., FIG. 3B, steps 370, 375; FIG. 4A, steps 415, 420, 425, 430) to posit and test potential missing steps or records in the item lifecycle. These hypothesized records may be stored in the temporary storage for analysis with the other records. The computing device may place an indicator in the record information that the record has been created (hypothesized) by the computing device. The same iterative mechanisms described above may be applied to these derived (hypothesized) records and the same assessment protocols may also be applied. In FIG. 3C, the Record P2B (in section 5.A.3) may be a constructed record that was created, assessed, passed probability analysis), and met the 3-step "truth basis assessment" shown in FIG. 4C.

Figure 4C:
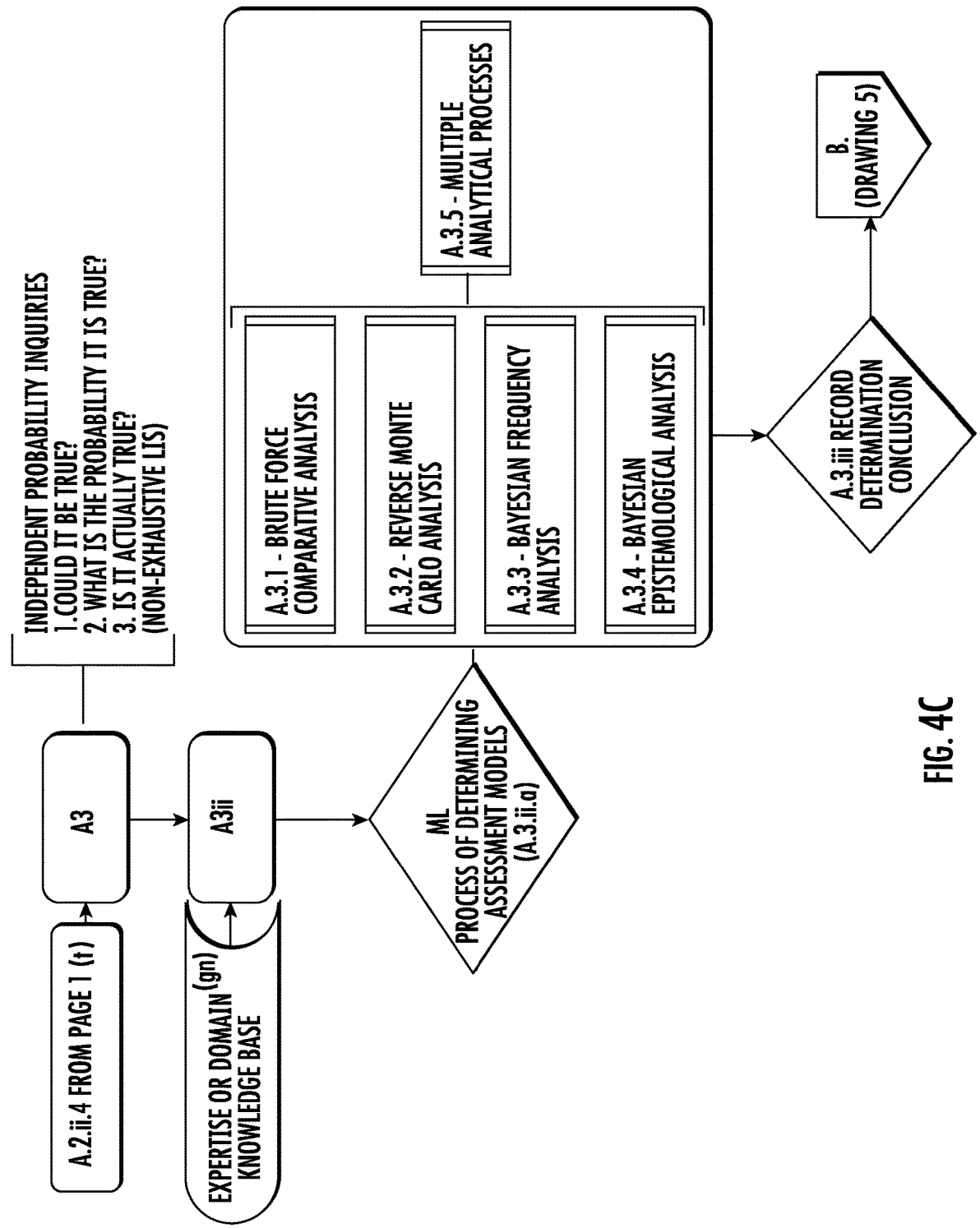

As noted above, the potential results of the inquiry may be processed and weighted. Further, variables associated with potential results may be correlated. Additionally, record flow sets may be determined, analyzed, and weighted by probability. After the processing is completed, each record, and each record set, may be analyzed to determine whether the records, and the record sets, are "actually true" as shown in FIG. 4C.

A distinguishing issue at play is that an outcome may indeed be true, although it has a low probability of being true. For example, it is highly unlikely an individual will ever be struck by lightning in their lifetime, and any statistical probability analysis will rank the outcomes as likely false for the possibility of being struck by lightning. Yet, every year, people are struck by lightning. Accordingly, a critical step in the process of determining the accuracy and/or actuality of a record in the lifecycle of an item is to analyze the determined probability outcomes for the record and record sets by comparing (evaluating) the probability outcomes against known values; consensus based "declared" values; physical or scientifically determined outcomes of an item or object when modifications, additions, refinement, combinations, or other outside forces act upon them; and other determinants that cause changes to an object ("deterministic changes").

While the types of items (e.g., objects) and their subsequent changes are nearly innumerable, each field (e.g., manufacture, engineering, materially science, chemistry, commerce, refinement, recycling, etc.) typically has a significant source of proven defined, tested, reviewed, and/or measurably provable sets of knowledge (i.e., knowledge base) regarding changes to items and their changes. Even when a knowledge base is lacking in a particular field, a combination of knowledge across multiple supporting fields can be used as a basis to determine changes to an object. Indeed, these changes may include speculative analysis of potential changes and/or probabilities of the outcomes of those changes. Such knowledge or information may be available in a data store associated with the computing device. Further, the knowledge or information may be accessible to the discoverative processes described herein.

Accordingly, the computing device may leverage known information about the types of items, types of characteristic or component changes, types of lifecycle flow changes, and/or the impacts, measurements, determinations, and outliers for each in order to assess the probability of "truthfulness" for the information contained within a record. Based on the outcome of the analysis, the computing device may determine a probability of "truthfulness" for a lifecycle flow for each combination of the resultant ranked (weighted) "truthfulness assessed" records.

The computing device may determine truthfulness of a record, or record set, through multiple mechanisms or combinations of mechanisms. In this regard, the computing device may use programmatic logic, rule management system based logic, one or more machine learning model based determined logic, or a combination of mechanisms of logic determinism or derived logic creation to determine which mechanism and/or process to determine the truthfulness of a record's information, the truth of the lifecycle records set of an item, and/or the truthfulness of the record constituents, owners, custodians, and other actors regarding the record(s)

itself. Additionally or alternatively, the computing device may leverage external logic, such as an artificial intelligence system, external services accessed via programmatic interfaces, and/or external rules logic to determine which mechanism and/or process to determine the truthfulness of a record's information, the truth of the lifecycle records set of an item, and/or the truthfulness of the record constituents, owners, custodians, and other actors regarding the record(s) itself.

In one example, the computing device may use a brute force analysis to determine the truthfulness of declared and/or derived results. A "brute force" frequency confidence interval may be determined (applied) by comparing every "result set" with every other "result set." Then, the computing device may apply a secondary, or tertiary, weighting to the outcome of this analysis. A sorting algorithm may then be applied based on the weighting. Next, the sorting algorithm may be applied to all known lifecycle flows in the ledger by writing temporary records against it and comparing the hash outcomes. The temporary write and/or hash comparison may be sorted again, for example, using a probabilistic confidence algorithm (e.g., Cartesian, Bayesian, etc.) to determine a "most likely true" result. The "most likely true" result may then be posted to the concurrence and acceptance process shown (e.g., step 390), for example, in FIG. 6.

In another example, the computing device may use a reverse Monte Carlo analysis to determine the truthfulness of declared and/or derived results. As noted above, the distributed record ledger system may include a set of highly probable or validated variables within the records comprising a lifecycle set as a result of the analysis described above. Accordingly, the computing device may invoke a Reverse Monte Carlo Analysis, where the "yobs" variable is the information in a field of the record, and the "ycalc" is the determined set of potential record(s) or hypothetical record(s), lifecycle record sets, and hypothetical record set(s), as determined by the item or lifecycle set being inquired upon at the constituent step in the process being invoked. The Reverse Monte Carlo method has significant advantages in that each iterative process provides a significant reduction in the number of probable records and/or record sets at each recursion. Additionally, using Reverse Monte Carlo method may produce similar deterministic results to comparative analysis with fewer process steps, thereby improving the performance of the computing device by consuming fewer processing cycles. Additionally, the Reverse Monte Carlo method may produce results with a higher confidence value. Further, as it uses an inverse problem determinism method, the Reverse Monte Carlo method may allow for assessing modelled results against predicted outcomes, while allowing for distinguished outliers (residuals) to be included in the analysis without biasing the analysis. The results of the Reverse Monte Carlo analysis may be posted to the concurrence and acceptance process (e.g., step 390) shown in FIG. 6, discussed below.

In another example, the computing device may use a Bayesian frequency analysis to determine the truthfulness of declared and/or derived results. Similar to the "brute force" method described above, the Bayesian frequency analysis may provide a statistical modeling of each potential record and/or lifecycle record set, which is then measured against the probability weightings, discussed above. While this may be useful in highly fluid and poorly defined lifecycle models, generally it requires the greatest amount of computational resources, as well as comparing nearly all records with all others in the data set being investigated. However, the advantage of the Bayesian frequency analysis is that every analysis (whether of a record, record information, or a lifecycle record set) is performed without bias to any prior data analysis, or prior weightings not purposefully applied in each iteration of the analysis. Accordingly, the results are unbiased before they are posted to the concurrence and acceptance process (e.g., step 390) shown in FIG. 6.

In yet another example, the computing device may use Bayesian Epistemological analysis to determine the truthfulness of declared and/or derived results. When assessing the validity of a record, record information, or a lifecycle record set, the computing device may presuppose that prior analysis outcomes (results) have a high probability of truthfulness when using the Bayesian Epistemological analysis. As a result, the outcomes of prior step analysis may provide continuous determination knowledge for subsequent steps/ analysis, such that any determination of "truthfulness" becomes less work-process intensive, and the volumes of records to be compared and analyzed may be reduced with each iteration. In such case, the results become highly reliable, but only so much as bias or "authoritatively posited but not actually true" information is not formed as part of the information being analyzed. The deterministic record ledger system may leverage this model, while also utilizing sophisticated techniques of machine learning backpropagation to remove bias from analytical algorithms, and/or to correct "authoritatively posited by not actually true" information within the system. Any results determined using the Bayesian Epistemological analysis may be posted to the concurrence and acceptance process shown in FIG. 6 for final determination (e.g., step 390).

In yet a further example one example, the computing device may use one or more of the analytical models discussed above to determine the truthfulness of declared and/or derived results.

The iterative process discussed above improves a computer's ability to identify related records and identify gaps in the sequences of those related records. Moreover, the iterative process above, in combination with the machine learning processes being implemented, improves a computer's ability to generate records to fill the identified gaps based on the data and/or information contained in related records already stored in the record system. That is, the processes described herein allow a computer to determine related records and identify gaps or missing information in the records. While a human may intuitively look at records and determine associations contained therein, a computer encounters problems in understanding the content of records that a human would not. These problems, unique to computing functionality and not encountered by human minds, are solved by the detailed steps described herein.

Figure 6A:
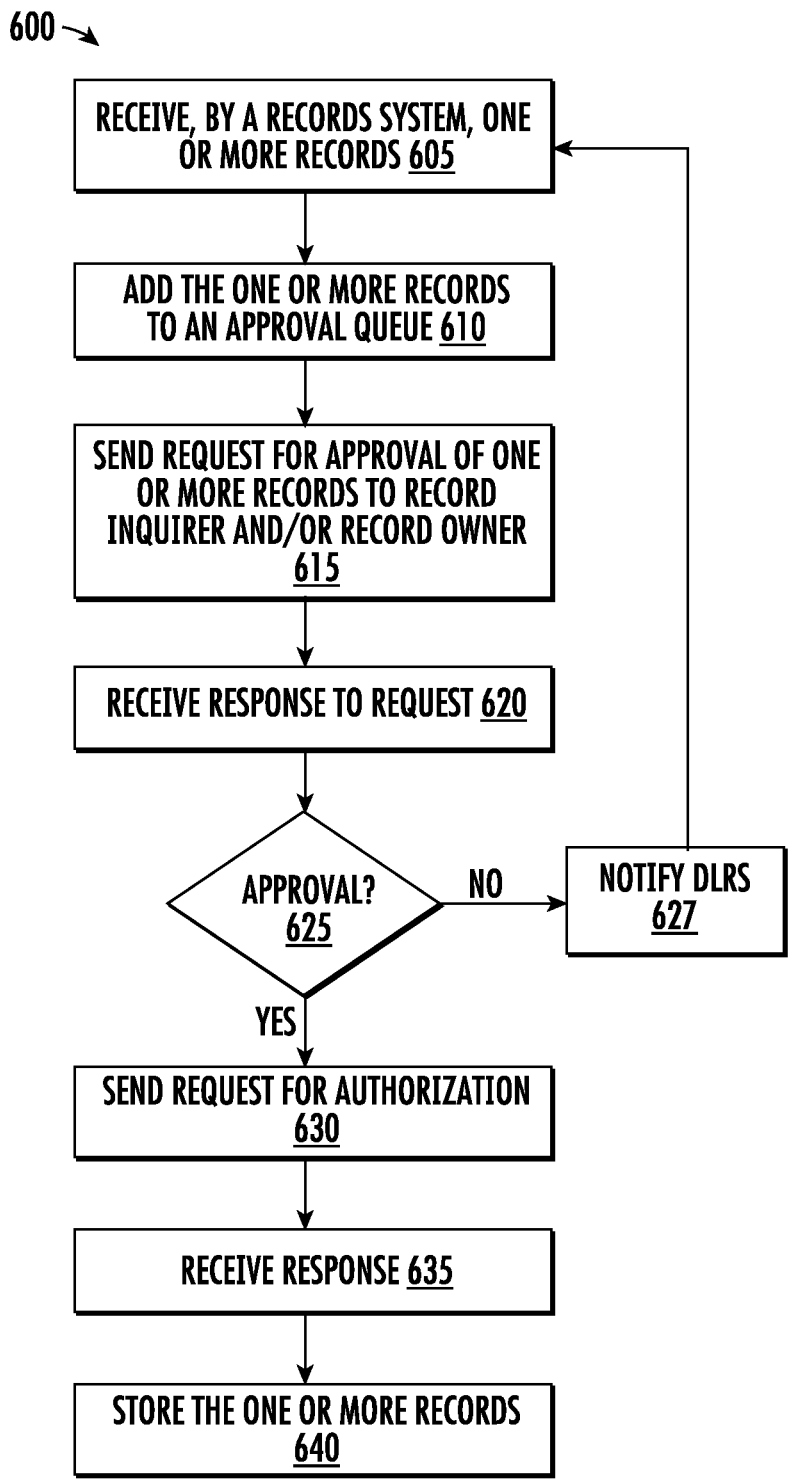
FIGS. 6A and 6B show a process for concurrence and acceptance of newly created records in accordance with one or more aspects of the disclosure.
Figure 6B:
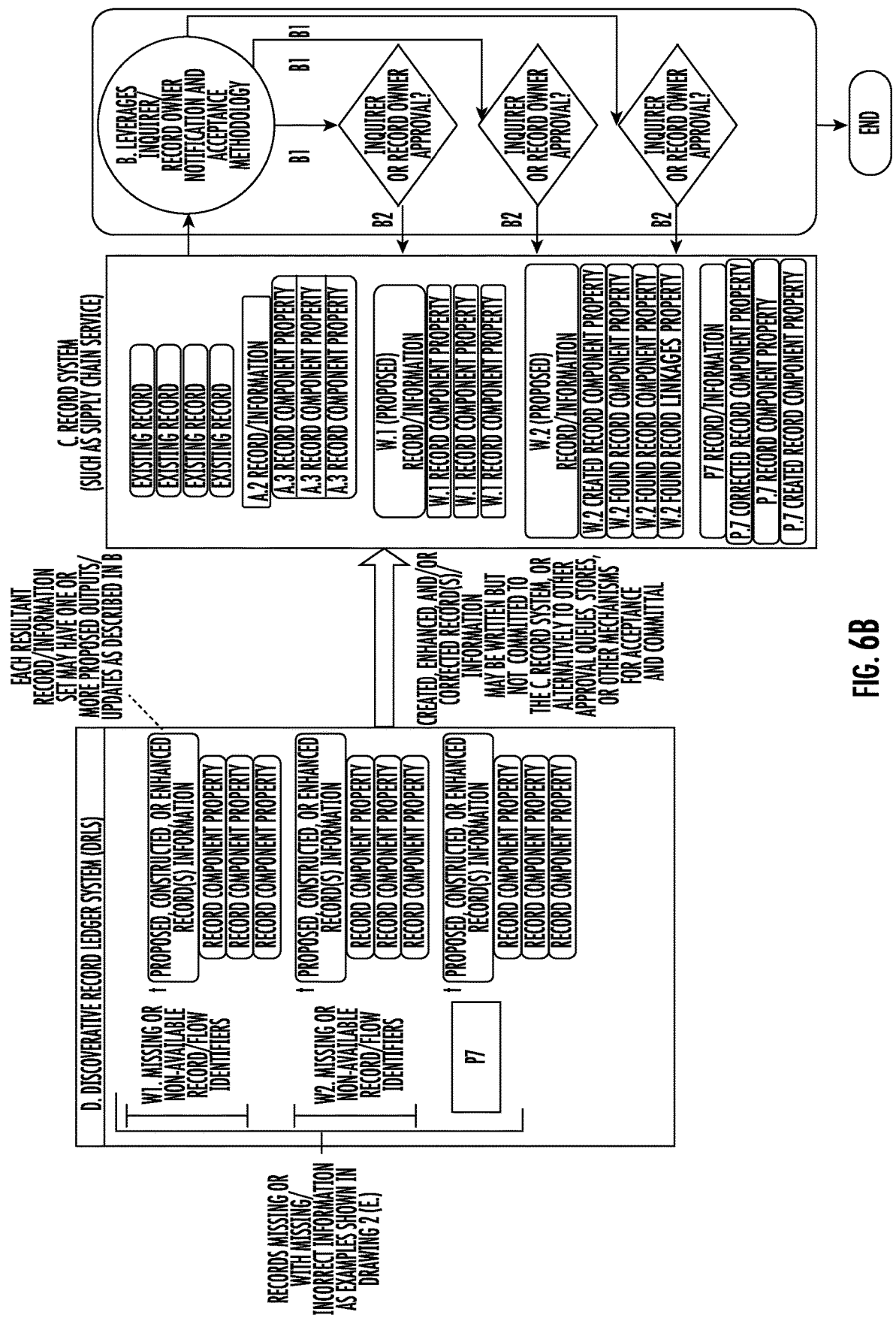

FIGS. 6A and 6B show an example of a concurrence and acceptance process 600 in accordance with one or more aspects of the disclosure. Some or all of the steps of process 600 may be performed using one or more computing devices as described herein, including, for example, the server 110, the first device 120, the second device 130, the record system 140, the DRLS 170, the computing device 200, or any combination thereof.

As the DRLS is used to capture, analyze, record, and inquire the records and their lifecycle contained therein, a protocol for accepting the updating or creation of records as crafted by the record system (other than for records written directly by custodial owners or constituents into the system) should be applied such that the custodians and constituents of such records or lifecycle record sets may concur with the information contained therein, and/or may accept (e.g. validate, sign, certify, corroborate, etc.) such records as part of the lifecycle of the item(s) being recorded in the system.

In step 605, the record system may receive one or more records. The one or more records may be received from the DRLS. The one or more records may comprise a new record to be added to a chain of records associated with a product or commodity. Additionally or alternatively, the one or more records may correct, change, edit, update, or otherwise modify a component of an existing record.

In step 620, the record system may add the one or more records queue. In step 615, the record system may send a request to approve the one or more records to at least one of the record inquirer or the record owner. Depending upon the implementation of this methodology, the underlying technology model for record publication, verification, and acceptance, should be utilized. For example, if a blockchain service is used as the ledger data store, the blockchain may have a notification service (e.g., B1 in FIG. 6). When a record is written to a node, the participating parties may be requested to digitally sign (and/or add their encryption authorization/key to) the record as the means to concur and accept the information contained in the record (e.g., B2 in FIG. 6). As a further example, in a database store, the database may receive the record in a temporary table or operational data table. The database may produce a notice of a pending record to an application or user via stored procedures or changelog publication to application interfaces notifying the user (or program) of the request to validate and accept the update. In these, and other technology models, this method is able to be implemented with the core capabilities of said technologies, as well as layering additional processing, encryption, signing, and access control mechanisms onto the deployed technology system. In further examples, the record system may send an electronic communication (e.g., an email, a text message, a push notification, etc.) to the one or more In step 620, the record system may receive a response to the request. The response may indicate a rejection of the one or more records. Accordingly, the record system may notify the DLRS in step 627. Additionally, the process may return to step 605 with the records system receive one or more additional records to fill in gaps and/or correct information associated with existing records. If the response indicates that the one or more records are approved, the process proceeds to step 630, where the records system may send a request for authorization. As noted above, the request for authorization may be sent to at least one of the record inquirer or the record owner. In step 635, the records system may receive a response to the request for authorization. As noted above, the response may include a digital signature or the addition of an encryption key. The authorization may indicate approval of the record to third parties. Upon receiving the response, the one or more records may be stored by the records system in step 640.

Should the implementation of this methodology include multiple underlying technologies (such as a combination of a database system, immutable data stores, blockchain hyper ledgers, and others) at the same time, the instructions to those systems should utilize the logic process system for the methodology, such as a rules management engine or blockchain smart contracts—such instructions being published, validated, and the audit for compliance, via the same communication mechanism(s) as the writing and reading of information, such as application programmable interface, messaging systems, and others.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language, such as (but not limited to) Perl, Python, or any suitable scripting language. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although certain specific aspects of various example embodiments have been described, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. Thus, embodiments disclosed should be considered in all respects as examples and not restrictive. Accordingly, the scope of the inventions herein should be determined not by the embodiments illustrated, but by the appended claims and their equivalents.

The invention claimed is:
1. A method comprising:
   receiving, by a computing device, a request for information associated with a first record;
   based on a determination that the first record has not been found or is incomplete, invoking an iterative discoverative process to identify missing information;
   analyzing, based on results obtained by querying a discoverative ledger, one or more records to identify a subset of records that may be associated with the first record;
   determining, based on analysis of the one or more records, that the first record is associated with an interrupted chain of records;
   based on a determination that the first record is associated with an interrupted chain of records, creating, using a machine learning model, one or more temporary records to replace missing information in the chain of records associated with the first record;
   sending, by the computing device to a user device, a first temporary record of the one or more temporary records;
   receiving, by the computing device from the user device, an indication that the first temporary record is approved; and
   storing the first temporary record to complete the interrupted chain of records.

2. The method of claim 1, further comprising:
sending, in response to the request for information associated with the first record, the first temporary record.

3. The method of claim 1, wherein the analyzing the one or more records to identify the subset of records that may be associated with the first record comprises at least one of: a Monte Carlo analysis; a Reverse Monte Carlo Analysis; a Bayesian frequency analysis; a Bayesian Epistemological analysis; or a derivative of such analysis.

4. The method of claim 1, wherein the creating the one or more temporary records is based on information contained in the subset of records that may be associated with the first record.

5. The method of claim 1, wherein the analyzing the one or more records to identify the subset of records that may be associated with the first record further comprises:
identifying a first subset of records that may be associated with the first record, wherein the first subset comprises a first probability that the first subset of records is associated with the first record;
identifying a second subset of records that may be associated with the first record, wherein the second subset comprises a second probability that the second subset of records is associated with the first record; and
selecting, based on the first probability being higher than the second probability, the first subset of records, wherein the one or more temporary records are generated based on data contained in the first subset of records.

6. The method of claim 1, wherein the storing the first temporary record to complete the interrupted chain of records comprises storing the first temporary record in the discoverative ledger.

7. The method of claim 1, wherein the sending the first temporary record comprises sending the first temporary record to at least one of a record inquirer or a record owner.

8. A computing system comprising:
one or more processors; and
memory storing instructions that, when executed by the one or more processors causes the computing system to:
receive a request for information associated with a first record;
based on a determination that the first record has not been found or is incomplete, invoke an iterative discoverative process to identify missing information;
analyze, based on results obtained by querying a discoverative ledger, one or more records to identify a subset of records that may be associated with the first record;
determine, based on analysis of the one or more records, that the first record is associated with an interrupted chain of records;
based on a determination that the first record is associated with an interrupted chain of records, create, using a machine learning model, one or more temporary records to replace missing information in the chain of records associated with the first record;
send, to a user device, a first temporary record of the one or more temporary records;
receive, from the user device, an indication that the first temporary record is approved; and
store the first temporary record to complete the interrupted chain of records.

9. The computing system of claim 8, wherein the instructions, when executed by the one or more processors, cause the computing system to:
send, in response to the request for information associated with the first record, the first temporary record.

10. The computing system of claim 8, wherein the instructions, when executed by the one or more processors, cause the computing system to analyze the one or more records to identify the subset of records that may be associated with the first record using at least one of: a Monte Carlo analysis; a Reverse Monte Carlo Analysis; a Bayesian frequency analysis; a Bayesian Epistemological analysis; or a derivative of such analysis.

11. The computing system of claim 8, wherein the instructions, when executed by the one or more processors, cause the computing system to create the one or more temporary records based on information contained in the subset of records that may be associated with the first record.

12. The computing system of claim 8, wherein the instructions, when executed by the one or more processors, cause the computing system to analyze the one or more records to identify the subset of records that may be associated with the first record by:
identifying a first subset of records that may be associated with the first record, wherein the first subset comprises a first probability that the first subset of records is associated with the first record;
identifying a second subset of records that may be associated with the first record, wherein the second subset comprises a second probability that the second subset of records is associated with the first record; and
selecting, based on the first probability being higher than the second probability, the first subset of records, wherein the one or more temporary records are generated based on data contained in the first subset of records.

13. The computing system of claim 8, wherein the instructions, when executed by the one or more processors, cause the computing system to store the first temporary record to complete the interrupted chain of records by storing the first temporary record in the discoverative ledger.

14. The computing system of claim 8, wherein the instructions, when executed by the one or more processors, cause the computing system to send the first temporary record by sending the first temporary record to at least one of a record inquirer or a record owner.

15. A non-transitory computer-readable medium comprising instructions that, when executed, configure a computing system to:
receive a request for information associated with a first record;
based on a determination that the first record has not been found or is incomplete, invoke an iterative discoverative process to identify missing information;
analyze, based on results obtained by querying a discoverative ledger, one or more records to identify a subset of records that may be associated with the first record;
determine, based on analysis of the one or more records, that the first record is associated with an interrupted chain of records;
based on a determination that the first record is associated with an interrupted chain of records, create, using a machine learning model, one or more temporary records to replace missing information in the chain of records associated with the first record;
send, to a user device, a first temporary record of the one or more temporary records;

receive, from the user device, an indication that the first temporary record is approved; and store the first temporary record to complete the interrupted chain of records.

16. The non-transitory computer-readable medium of claim 15, wherein the instructions, when executed, configure the computing system to:

send, in response to the request for information associated with the first record, the first temporary record.

17. The non-transitory computer-readable medium of claim 15, wherein the instructions, when executed, configure the computing system to analyze the one or more records to identify the subset of records that may be associated with the first record using at least one of:

a Monte Carlo analysis; a Reverse Monte Carlo Analysis; a Bayesian frequency analysis; a Bayesian Epistemological analysis; or a derivative of such analysis.

18. The non-transitory computer-readable medium of claim 15, wherein the instructions, when executed, configure the computing system to create the one or more temporary records based on information contained in the subset of records that may be associated with the first record.

19. The non-transitory computer-readable medium of claim 15, wherein the instructions, when executed, configure the computing system to analyze the one or more records to identify the subset of records that may be associated with the first record by:

identifying a first subset of records that may be associated with the first record, wherein the first subset comprises a first probability that the first subset of records is associated with the first record;

identifying a second subset of records that may be associated with the first record, wherein the second subset comprises a second probability that the second subset of records is associated with the first record; and selecting, based on the first probability being higher than the second probability, the first subset of records, wherein the one or more temporary records are generated based on data contained in the first subset of records.

20. The non-transitory computer-readable medium of claim 15, wherein the instructions, when executed, configure the computing system to store the first temporary record to complete the interrupted chain of records by storing the first temporary record in the discoverative ledger.

21. The non-transitory computer-readable medium of claim 15, wherein the instructions, when executed, configure the computing system to send the first temporary record by sending the first temporary record to at least one of a record inquirer or a record owner.

* * * * *